US012651773B2

(12) United States Patent
Lin et al.

(10) Patent No.: US 12,651,773 B2
(45) Date of Patent: Jun. 9, 2026

(54) CYCLIC SULFONATE ADDITIVE FOR ELECTROLYTE OF LITHIUM-ION BATTERY (LIB) AND PREPARATION METHOD AND USE THEREOF

(71) Applicant: VALIANT CO., LTD., Yantai (CN)

(72) Inventors: Cunsheng Lin, Yantai (CN); Yuanyuan Gong, Yantai (CN); Zhaolin Liu, Yantai (CN); Qingliang Lu, Yantai (CN); Bin Liu, Yantai (CN); Yu Shi, Yantai (CN)

(73) Assignee: VALIANT CO., LTD., Yantai (CN)

( * ) Notice: Subject to any disclaimer, the term of this patent is extended or adjusted under 35 U.S.C. 154(b) by 567 days.

(21) Appl. No.: 18/031,626

(22) PCT Filed: Nov. 20, 2020

(86) PCT No.: PCT/CN2020/130467

§ 371 (c)(1),
(2) Date: Apr. 13, 2023

(87) PCT Pub. No.: WO2022/104710

PCT Pub. Date: May 27, 2022

(65) Prior Publication Data

US 2023/0387462 A1 Nov. 30, 2023

(30) Foreign Application Priority Data

Nov. 19, 2020 (CN) ........................ 202011303478.3

(51) Int. Cl.

*H01M 10/0567* (2010.01)
*H01M 10/0525* (2010.01)
*H01M 10/0568* (2010.01)
*H01M 10/0569* (2010.01)

(52) U.S. Cl.

CPC ... *H01M 10/0567* (2013.01); *H01M 10/0525* (2013.01); *H01M 10/0568* (2013.01); *H01M 10/0569* (2013.01); *H01M 2300/0028* (2013.01)

(58) Field of Classification Search

None

See application file for complete search history.

(56) References Cited

U.S. PATENT DOCUMENTS

| | | | |
|---|---|---|---|
| 2004/0043300 A1 | 3/2004 | Utsugi et al. | |
| 2022/0109191 A1* | 4/2022 | Zheng | H01M 10/4235 |

FOREIGN PATENT DOCUMENTS

| | | | |
|---|---|---|---|
| CN | 101456855 A | | 6/2009 |
| CN | 102017270 A | | 4/2011 |
| CN | 102113163 A | | 6/2011 |
| CN | 102249861 A | | 11/2011 |
| CN | 103283076 A | | 9/2013 |
| CN | 104803967 A | | 7/2015 |
| CN | 108484567 A | | 9/2018 |
| CN | 109256590 A | | 1/2019 |
| CN | 111403807 A | * | 7/2020 |
| JP | 2017037808 A | | 2/2017 |
| JP | 2017117684 A | * | 6/2017 |
| KR | 20120034698 A | | 4/2012 |

* cited by examiner

*Primary Examiner* — Maria V Ewald
*Assistant Examiner* — Suhani Jitendra Patel
(74) *Attorney, Agent, or Firm* — Bayramoglu Law Offices LLC

(57) ABSTRACT

A cyclic sulfonate additive for an electrolyte of a lithium-ion battery (LIB) is disclosed, with a structure shown in formula I:

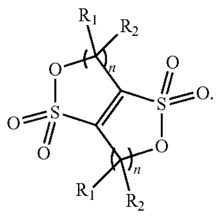

A non-aqueous electrolyte of a LIB can be prepared with the cyclic sulfonate additive for the electrolyte of the LIB as one of additives, together with a non-aqueous solvent, and an electrolyte lithium salt, and arranged between a negative electrode and a positive electrode to fabricate a LIB. The present disclosure provides a use of the cyclic sulfonate additive in a LIB, which can effectively inhibit the reduction of battery capacity during high-temperature cycling and high-temperature storage, and can also inhibit the decomposition of an electrolyte to produce a gas.

13 Claims, No Drawings

CYCLIC SULFONATE ADDITIVE FOR ELECTROLYTE OF LITHIUM-ION BATTERY (LIB) AND PREPARATION METHOD AND USE THEREOF

CROSS REFERENCE TO THE RELATED APPLICATIONS

This application is the national phase entry of International Application No. PCT/CN2020/130467, filed on Nov. 20, 2020, which is based upon and claims priority to Chinese Patent Application No. 202011303478.3, filed on Nov. 19, 2020, the entire contents of which are incorporated herein by reference.

TECHNICAL FIELD

The present disclosure relates to the field of lithium batteries, and in particular, relates to a cyclic sulfonate additive for an electrolyte of a lithium-ion battery (LIB), and a preparation method and use thereof.

BACKGROUND

A LIB is mainly composed of a positive electrode, a non-aqueous electrolyte, and a negative electrode. A negative electrode constituting a LIB is currently fabricated by a material such as lithium metal, a metal compound capable of absorbing and releasing lithium (such as a metal monomer, an oxide, and a lithium-containing alloy), and a carbon material. In particular, LIBs with carbon materials capable of absorbing/releasing lithium, such as artificial graphite and natural graphite, are widely used. At present, when a LIB with a highly crystallized carbon material, such as natural graphite and artificial graphite as an anode material, is charged, a non-aqueous solvent in a non-aqueous electrolyte is reduced and decomposed on a surface of a negative electrode, and decomposition products and gases produced accordingly will hinder the original electrochemical reaction of the battery, thereby reducing the cycling performance.

In addition, a LIB with a lithium metal or an alloy thereof, a metal monomer such as silicon and tin, or an oxide as an anode material has a high initial capacity, but the anode material undergoes aggravated micronization during cycling, and a non-aqueous solvent is more prone to reduction and decomposition than that in a LIB with a negative electrode of a carbon material, which will significantly reduce the battery performance, such as battery capacity and cycling performance.

Known cathode materials include $LiCoO_2$, $LiMn_2O_4$, $LiNiO_2$, $LiFePO_4$, or the like. When a LIB with one of these cathode materials is at a high temperature during charging, a non-aqueous solvent in a non-aqueous electrolyte will be partially oxidized and decomposed locally at an interface between the cathode material and the non-aqueous electrolyte, and decomposition products and gases produced accordingly will hinder the original electrochemical reaction of the battery, thereby reducing the cycling performance.

To overcome the local decomposition at positive and negative electrodes and improve the battery performance as reflected by long-term durability and output characteristics, it is important to form a stable long-term solid electrolyte interface (SEI) with high ion conductivity and low electron conductivity. Currently, a small amount of a cyclic sulfonate additive such as DTD, PST, and PS is generally added to an electrolyte to promote the formation of an SEI film, thereby inhibiting a decomposition reaction of a solvent on a negative electrode, the reduction in battery capacity during high-temperature storage, the gas production, and the deterioration of battery load characteristics.

SUMMARY

In view of the above problems, the present disclosure provides a cyclic sulfonate additive for an electrolyte of a LIB, with a structure shown in formula I:

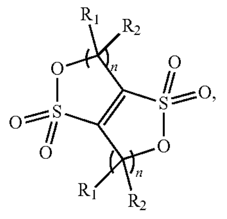

where $R_1$ and $R_2$ each are independently one selected from the group consisting of hydrogen, fluorine, phenyl, fluorine or cyano-containing phenyl, linear or non-linear alkyl with 1 to 6 carbon atoms, and fluorine-containing alkyl with 1 to 6 carbon atoms; and n is 1 or 2.

A series of additives corresponding to the above general formula can be uniformly prepared through the following method:

1) under the protection of an inert gas and at a temperature of 20° C. to 110° C., dispersing a mixture of a raw material 1, sodium sulfite, and sodium bisulfite uniformly in a solvent, conducting a reaction for 1 h to 24 h, removing the solvent under reduced pressure until there is no distillate, and subjecting a residue to acidification with concentrated hydrochloric acid to obtain a crude intermediate 1, where structures of the raw material 1 and the intermediate 1 are as follows:

raw material 1

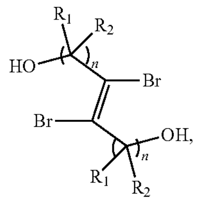

intermediate 1

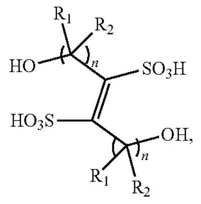

where n is 1 or 2;

where a mole number of the sodium sulfite is 0.2 to 0.8 times and preferably 0.3 to 0.5 times a mole number of the raw material 1; and a mole number of the sodium bisulfite is 1.8 to 2.4 times a mole number of the raw material 1; and the solvent is one or a combination of two or more selected from the group consisting of water, methanol, ethanol, acetonitrile, and tetrahydrofuran (THF); and 2) under the protection of an inert gas, adding an organic solvent to the intermediate 1, heating at 80° C. to 180° C. for reflux to separate water until there is no water, and removing the solvent under reduced pressure until there is no distillate; and heating at 10 Pa to 3,000 Pa and 100° C. to 230° C. to allow a reaction for 1 h to 20 h to obtain the cyclic sulfonate additive for an electrolyte of a LIB, where the organic solvent is one or a combination of two or more selected from the group consisting of chlorobenzene, dichlorobenzene, and nitrobenzene.

Specifically, the cyclic sulfonate additive for an electrolyte of a LIB of the present disclosure has a specific structure shown in formulas S01 to S27:

S01

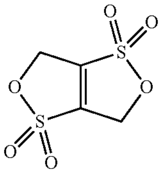

S02

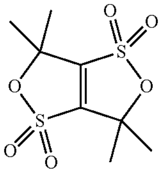

S03

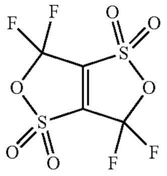

S04

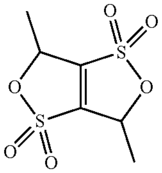

S05

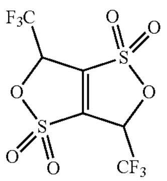

S06

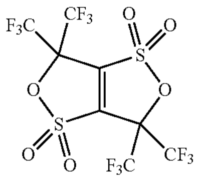

-continued

S07

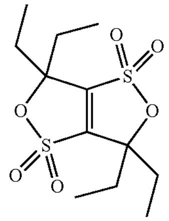

S08

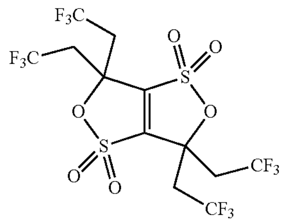

S09

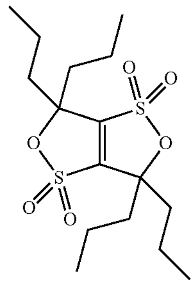

S10

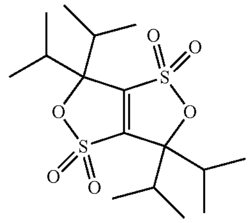

S11

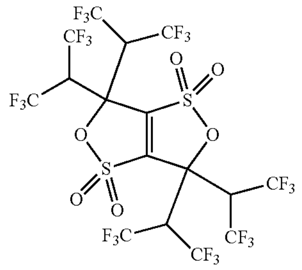

S12

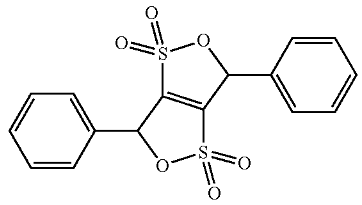

-continued
S13
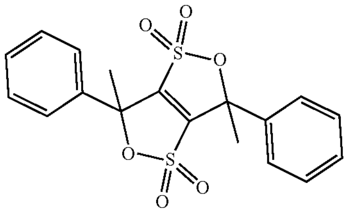
S14
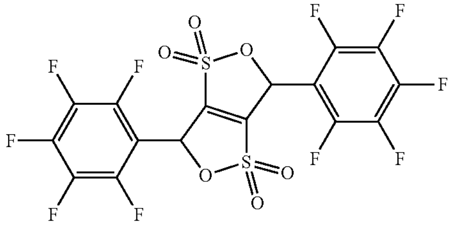
S15
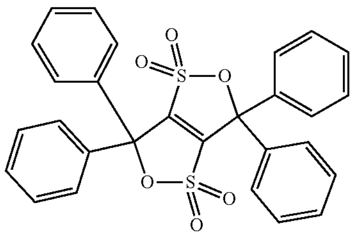
S16
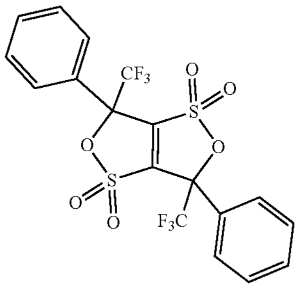
S17
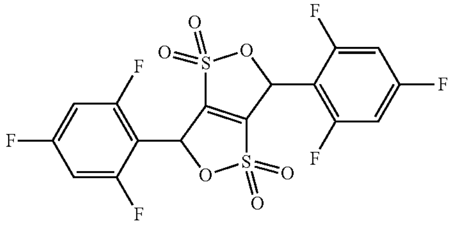
S18
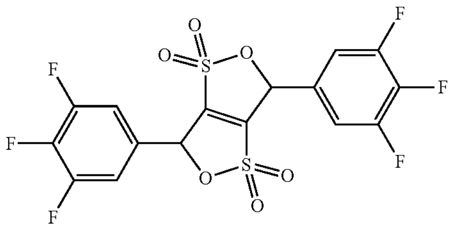
-continued
S19
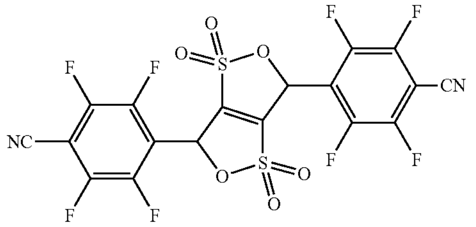
S20
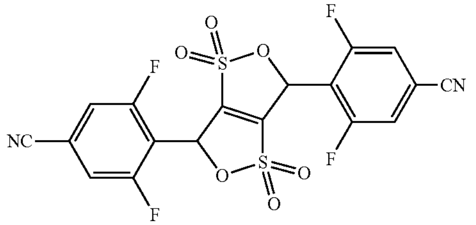
S21
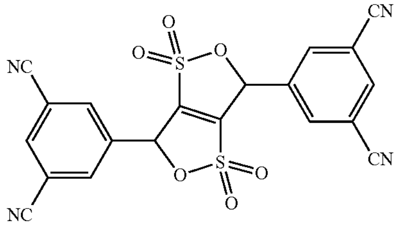
S22
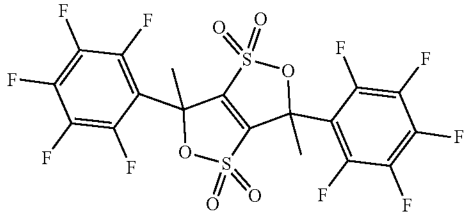
S23
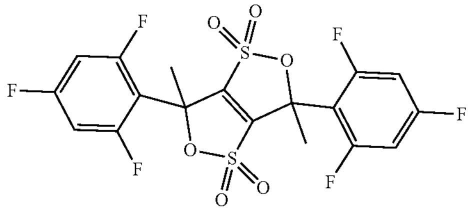
S24
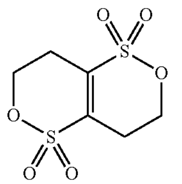
S25
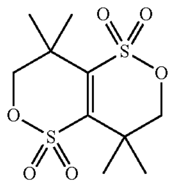

-continued

S26

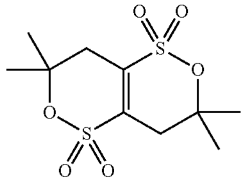

S27

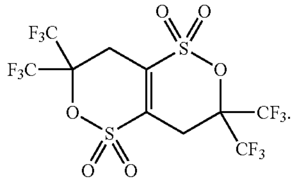

The cyclic sulfonate additive for an electrolyte of a LIB in the present disclosure needs to be used in combination with a non-aqueous solvent and an electrolyte lithium salt to prepare a non-aqueous electrolyte of a LIB, where a weight of the cyclic sulfonate additive is 0.01% to 10% of a weight of the non-aqueous electrolyte and a weight of the electrolyte lithium salt is 10% to 20% of the non-aqueous electrolyte.

Optionally, the non-aqueous solvent is one or a combination of two or more selected from the group consisting of ethylene carbonate, propylene carbonate, butylene carbonate, fluoroethylene carbonate (FEC), dimethyl carbonate (DMC), diethyl carbonate (DEC), dipropyl carbonate (DPC), ethyl methyl carbonate (EMC), dipropyl carbonate (DPC), methyl propyl carbonate (MPC), ethyl propyl carbonate, methylpropyne carbonate, 1,4-butyrolactone, methyl propionate, methyl butyrate, ethyl acetate, ethyl propionate, propyl propionate, and ethyl butyrate; an amount of the electrolyte lithium salt is 10 wt % to 20 wt % of a total amount of the non-aqueous electrolyte of the LIB; and the electrolyte lithium salt is one or a combination of two or more selected from the group consisting of $LiPF_6$, $LiClO_4$, $LiBF_4$, LiBOB, LiODFB, LiTDI, LiTFSI, and LiFSI.

A non-aqueous electrolyte prepared with the additive of the present disclosure can be used in a common LIB, where the non-aqueous electrolyte is arranged together with a separator between a negative electrode and a positive electrode of the LIB. When used in a lithium battery, the cyclic sulfonate additive for an electrolyte of a LIB in the present disclosure can effectively inhibit the reduction of battery capacity during high-temperature cycling and high-temperature storage, and can also inhibit the decomposition of an electrolyte to produce a gas.

DETAILED DESCRIPTION OF THE EMBODIMENTS

The present disclosure is described below in conjunction with embodiments. The listed embodiments are only used to explain the present disclosure, rather than to limit the scope of the present disclosure.

I. Synthesis of Cyclic Sulfonates

1. Synthesis of S01

(1) Preparation of an Intermediate 1

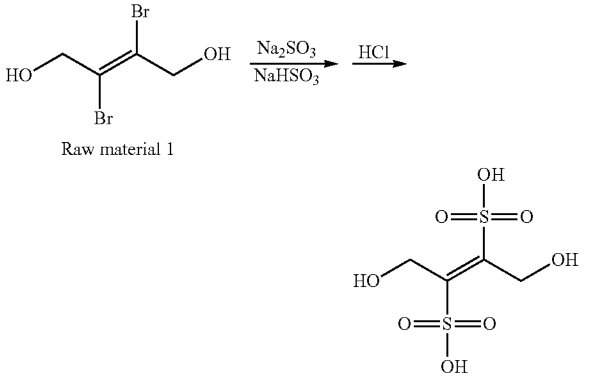

Raw material 1

Intermediate 1

A raw material 1 was purchased commercially or prepared by the preparation method of the patent CN102249861.

123 g of the raw material 1, 50.4 g of sodium sulfite, and 140.05 g of sodium bisulfite were added to a 2 L three-necked flask, then 550 g of deionized water and 150 g of ethanol were added, and a resulting mixture was stirred vigorously and heated to allow a reaction under reflux for 18 h; the solvent was removed under reduced pressure until there was no distillate, a resulting black residue was dissolved with ethanol, a hydrogen chloride gas was introduced for acidification, and a large amount of a NaCl solid was precipitated; and a resulting system was filtered to remove insoluble substances, and a resulting filtrate was further subjected to solvent removal until there was no distillate to obtain 153 g of the intermediate 1 for later use, which included a part of the solvent.

(2) Preparation of S01

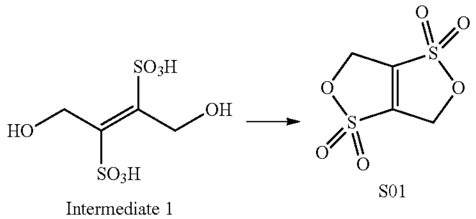

Intermediate 1

S01

Chlorobenzene was added to the intermediate 1, a resulting mixture was heated to 132° C. for reflux, and water was separated by a water separator until there was no obvious water droplet; the solvent was removed with a vacuum distillation device until there was no distillate, and a residue was heated at 50 Pa to 100 Pa and 130° C. to allow a reaction for 3.0 h to obtain a black viscous solid; a resulting reaction system was cooled to 20° C. to 30° C., DMC was added to the reaction system for dissolution, SHIRASAGI A activated carbon was added, and a resulting mixture was stirred at 50° C. to 60° C. for 30 min to allow decolorization; and a resulting system was cooled to room temperature and then filtered, and a resulting filtrate was subjected to solvent removal and then to recrystallization with DMC and n-heptane to obtain 37.1 g of a white solid S01, with a yield of 34.97%.

GC-MS: 211, $^1H$ NMR (400 MHz): solvent deuterated chloroform, δ (ppm): 4.322 ppm (S, 1H).

2. Preparation of S15

(1) Preparation of an Intermediate 1

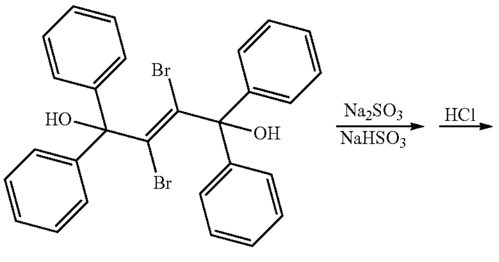

Raw material 1

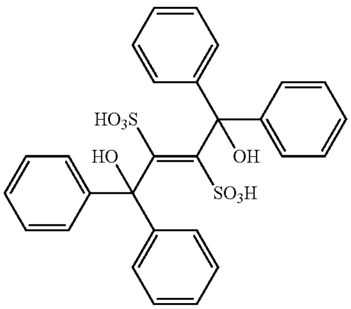

Intermediate 1

55.0 g of the raw material 1, 10.1 g of sodium sulfite, and 28.0 g of sodium bisulfite were added to a 500 mL three-necked flask, then 100 g of deionized water and 30 g of ethanol were added, and a resulting mixture was stirred vigorously and heated to allow a reaction under reflux for 24 h; the solvent was removed under reduced pressure until there was no distillate, a resulting black residue was dissolved with ethanol, a hydrogen chloride gas was introduced for acidification, and a large amount of a NaCl solid was precipitated; and a resulting system was filtered to remove insoluble substances, and a resulting filtrate was further subjected to solvent removal until there was no distillate to obtain 62 g of the intermediate 1 for later use, which included a part of the solvent.

(2) Preparation of S15

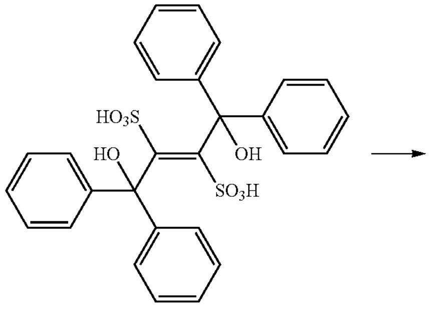

Intermediate 1

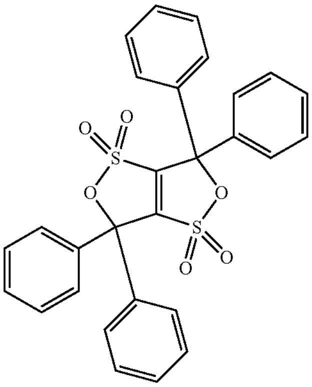

S15 o-Dichlorobenzene was added to the intermediate 1, a resulting mixture was heated to 150° C. for reflux, and water was separated by a water separator until there was no obvious water droplet; the solvent was removed with a vacuum distillation device until there was no distillate, and a residue was heated at 50 Pa to 100 Pa and 160° C. to allow a reaction for 5.0 h to obtain a black viscous solid; a resulting reaction system was cooled to 20° C. to 30° C., DMC was added to the reaction system for dissolution, SHIRASAGI A activated carbon was added, and a resulting mixture was stirred at 50° C. to 60° C. for 30 min to allow decolorization; and a resulting system was cooled to room temperature and then filtered, and a resulting filtrate was subjected to solvent removal and then to recrystallization with DMC and n-heptane to obtain 14.8 g of a white solid S15, with a yield of 28.68%.

GC-MS: 516, $^1H$ NMR (400 MHz): solvent deuterated chloroform, δ (ppm): 7.352 ppm to 7.303 ppm (m, 5H).

3. Preparation of S24

(1) Preparation of an Intermediate 1

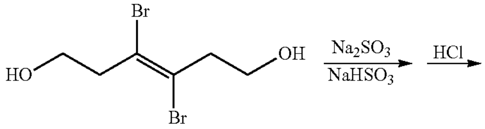

Raw material 1

-continued

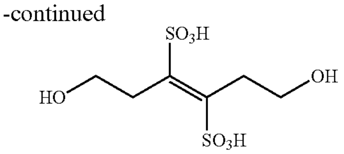

Intermediate 1

54.8 g of the raw material 1, 20.3 g of sodium sulfite, and 56.0 g of sodium bisulfate were added to a 500 mL three-necked flask, then 250 g of deionized water and 50 g of ethanol were added, and a resulting mixture was stirred vigorously and heated to allow a reaction under reflux for 14 h; the solvent was removed under reduced pressure until there was no distillate, a resulting black residue was dissolved with ethanol, a hydrogen chloride gas was introduced for acidification, and a large amount of a NaCl solid was precipitated; and a resulting system was filtered to remove insoluble substances, and a resulting filtrate was further subjected to solvent removal until there was no distillate to obtain 61 g of the intermediate 1 for later use, which included a part of the solvent.

(2) Preparation of S24

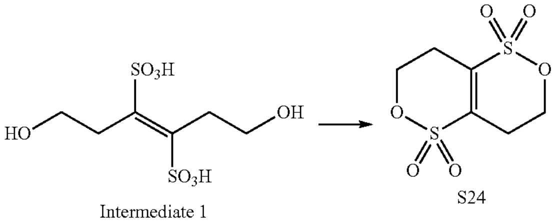 [SMILES: O=S(=O)(O)/C(CCO)=C(\CCO)S(=O)(=O)O ; O=S1(=O)OCCC2=C1CCOS2(=O)=O ; "S24"]

Intermediate 1 S24

Chlorobenzene was added to the intermediate 1, a resulting mixture was heated to 132° C. for reflux, and water was separated by a water separator until there was no obvious water droplet; the solvent was removed with a vacuum distillation device until there was no distillate, and a residue was heated at 50 Pa to 100 Pa and 130° C. to allow a reaction for 8.0 h to obtain a black viscous solid; a resulting reaction system was cooled to 20° C. to 30° C., DMC was added to the reaction system for dissolution, SHIRASAGI A activated carbon was added, and a resulting mixture was stirred at 50° C. to 60° C. for 30 min to allow decolorization; and a resulting system was cooled to room temperature and then filtered, and a resulting filtrate was subjected to solvent removal and then to recrystallization with DMC and n-heptane to obtain 12.1 g of a white solid S24, with a yield of 25.20%.

GC-MS: 240, $^{1}H$ NMR (400 MHz): solvent deuterated chloroform, δ (ppm): 3.603 ppm to 3.582 ppm (t, 2H) and 2.219 ppm to 2.198 ppm (t, 2H).

II. Non-aqueous Electrolytes and Lithium Batteries

The prepared compounds each were used to prepare the non-aqueous electrolytes for a LIB in Examples 1 to 12, and corresponding lithium battery compositions were shown in Table 1.

TABLE 1

Electrolyte formula and lithium battery composition

| | Cathode material | Cyclic sulfonate | Other additives | Ethylene carbonate:DEC:MPC:propyl propionate (weight ratio, %) |
|---|---|---|---|---|
| Example 1 | $LiCoO_2$ | 0.5% S01 | / | 30:30:25:15 |
| Example 2 | $LiCoO_2$ | 0.5% S01 | 0.5% methylpropyne carbonate | 30:30:25:15 |
| Example 3 | $LiCoO_2$ | 1.0% S01 | / | 30:30:25:15 |
| Example 4 | $LiCoO_2$ | 1.0% S01 | 0.5% methylpropyne carbonate | 30:30:25:15 |
| Example 5 | $LiMn_2O_4$ | 1.0% S01 | / | 30:30:25:15 |
| Example 6 | $LiCoO_2$ | 1.0% S02 | / | 30:30:25:15 |
| Example 7 | $LiCoO_2$ | 2.0% S02 | 0.2% methylpropyne carbonate | 30:30:25:15 |
| Example 8 | $LiCoO_2$ | 2.0% S12 | / | 30:30:25:15 |
| Example 9 | $LiCoO_2$ | 2.0% S12 | 0.5% methylpropyne carbonate | 30:30:25:15 |
| Example 10 | $LiCoO_2$ | 1.5% S15 | / | 30:30:25:15 |
| Example 11 | $LiCoO_2$ | 1.0% S24 | 0.5% methylpropyne carbonate | 30:30:25:15 |
| Example 12 | $LiMn_2O_4$ | 1.0% S24 | / | 30:30:25:15 |
| Comparative Example 1 | $LiCoO_2$ | / | / | 30:30:25:15 |
| Comparative Example 2 | $LiCoO_2$ | / | 0.5% methylpropyne carbonate | 30:30:25:15 |
| Comparative Example 3 | $LiMn_2O_4$ | 1.5% PST | / | 30:30:25:15 |
| Comparative Example 4 | $LiCoO_2$ | 1.5% PST | 0.5% methylpropyne carbonate | 30:30:25:15 |

TABLE 1-continued

| Electrolyte formula and lithium battery composition | | | | |
|---|---|---|---|---|
| | Cathode material | Cyclic sulfonate | Other additives | Ethylene carbonate:DEC:MPC:propyl propionate (weight ratio, %) |
| Comparative Example 5 | $LiCoO_2$ | 1.5% sulfolane | 0.5% methylpropyne carbonate | 30:30:25:15 |
| Comparative Example 6 | $LiCoO_2$ | 2.0% sulfolane | / | 30:30:25:15 |

Preparation Method of Lithium Batteries in Examples 1 to 12 and Comparative Examples 1 to 6

(1) Fabrication of a Positive Electrode Sheet

With a $LiCoO_2$ cathode material as an example: A $LiCoO_2$ powder, carbon black (with a particle size of 1,000 nm), polyvinylidene fluoride (PVDF), and N-methylpyrrolidone (NMP) were mixed to prepare a homogeneous slurry, the slurry was evenly coated on an aluminum foil (15 μm) current collector, and the current collector was dried and rolled to obtain a $LiCoO_2$ positive electrode sheet; the positive electrode sheet was dried at 120° C. for 12 h, such that $LiCoO_2$ accounted for 94% of the total coating, the binder accounted for 4%, and the carbon black accounted for 2%; and the electrode sheet was cut into a disc with a diameter of 8 mm. Other positive electrode sheets were fabricated in the same way.

(2) Fabrication of a Negative Electrode Sheet

With an artificial graphite anode material as an example: Artificial graphite, PVDF, and NMP were mixed to prepare a homogeneous slurry, then the slurry was evenly coated on a copper foil (15 μm) current collector, and the current collector was dried and rolled to obtain a carbon negative electrode sheet; the carbon negative electrode sheet was dried at 120° C. for 12 h, such that the graphite accounted for 96.4% of the total coating and the binder accounted for 3.6%; and the carbon negative electrode sheet was cut into a disc with a diameter of 8 mm.

(3) Preparation of an Electrolyte

In an argon atmosphere glove box with a moisture content of less than 1 ppm, a lithium salt was dissolved in a solvent, then a new cyclic sulfonate additive was added, and a resulting mixture was thoroughly mixed to obtain an electrolyte.

(4) Fabrication of a LIB

A CR2430 button battery was assembled with the electrode sheets fabricated in steps (1) and (2) as working electrodes and a Celgard 2400 membrane (Tianjin) as a separator, with an assembly order from the negative electrode to the positive electrode as follows: negative electrode shell, shrapnel, gasket, negative electrode sheet, electrolyte, separator, positive electrode sheet, and positive electrode shell; and sealing was conducted by a sealing machine. The above operations were conducted in a pure argon glove box.

III. Performance Tests of Lithium Batteries

Test 1. High-Temperature Cycling Performance Test

The fabricated batteries each were tested as follows:

(1) At 45° C., a battery was charged to 4.3 V at 0.1 C, and then discharged to 2.7 V at a corresponding rate, which was the first cycle.

(2) After the first cycle was completed, the battery was charged to 4.3 V at 1.0 C, and then discharged to 2.7 V at a corresponding rate, and 50, 100, and 500 cycles were conducted under these cycling conditions. Capacity retention rates after 50, 100, and 500 cycles of the battery each were calculated according to the following formula:

capacity retention rate after cycles=(discharge capacity after a corresponding number of cycles/discharge capacity of the first cycle)×100%.

Test data were shown in Table 2.

TABLE 2

| Test results of cycling performance of lithium batteries | | | |
|---|---|---|---|
| | Capacity retention rate/% | | |
| | 50 cycles | 100 cycles | 500 cycles |
| Example 1 | 89.57 | 81.37 | 64.41 |
| Example 2 | 91.09 | 86.70 | 74.14 |
| Example 3 | 91.45 | 86.84 | 74.84 |
| Example 4 | 93.19 | 88.70 | 83.21 |
| Example 5 | 91.61 | 88.05 | 81.34 |
| Example 6 | 89.90 | 84.14 | 69.39 |
| Example 7 | 90.47 | 87.00 | 77.13 |
| Example 8 | 89.92 | 81.77 | 65.82 |
| Example 9 | 90.41 | 85.48 | 73.27 |
| Example 10 | 90.02 | 84.58 | 70.36 |
| Example 11 | 92.03 | 87.91 | 81.15 |
| Example 12 | 90.15 | 85.70 | 75.16 |
| Comparative Example 1 | 81.24 | 69.50 | 48.06 |
| Comparative Example 2 | 85.01 | 70.29 | 55.29 |
| Comparative Example 3 | 87.26 | 72.31 | 57.23 |
| Comparative Example 4 | 88.39 | 73.24 | 60.31 |
| Comparative Example 5 | 85.48 | 71.23 | 56.83 |
| Comparative Example 6 | 83.23 | 70.06 | 54.64 |

It can be seen from the data of different batteries in Table 2 that, at 45° C., a lithium battery fabricated with the additive of the present disclosure has cycling stability, and a much higher capacity retention rate than the lithium battery without the additive in Comparative Example 1; and even compared with the lithium batteries including commercial additives in Comparative Examples 2 to 5, the lithium battery fabricated with the additive of the present disclosure exhibits an obvious advantage in the 500-cycle battery capacity retention rate, especially in the presence of methylpropyne carbonate.

Test 2 Thermal Stability Test

The batteries obtained in Examples 1 to 12 and Comparative Examples 1 to 6 each were subjected to 100 cycles, and then subjected to a thermal stability test as follows:

At 25° C., a battery was charged to 4.3 V at 0.5 C and then charged to a current of 0.025 C at 4.3 V, such that the battery was in a 4.3 V fully-charged state; and then the battery was stored in a high-temperature furnace at 65° C. for 15 d, during which a voltage drop of the battery in the high-temperature furnace was tested and a volume change of the battery after the test was determined. Test data were shown in Table 3.

Voltage drop change rate (%) of a LIB after high-temperature storage=(voltage of the LIB before high-temperature storage−voltage of the LIB after high-temperature storage)/voltage of the LIB before high-temperature storage×100%; and volume change rate (%) of a LIB after high-temperature storage=(volume of the LIB after high-temperature storage−volume of the LIB before high-temperature storage)/volume of the LIB before high-temperature storage×100%.

TABLE 3

Test results of thermal stability of lithium batteries

| | Thermal stability test | |
|---|---|---|
| | Voltage drop change rate (%) | Volume change rate (%) |
| Example 1 | 14.91 | 6.79 |
| Example 2 | 14.56 | 6.23 |
| Example 3 | 13.29 | 5.62 |
| Example 4 | 11.26 | 4.14 |
| Example 5 | 12.21 | 4.64 |
| Example 6 | 13.98 | 5.90 |
| Example 7 | 12.58 | 4.84 |
| Example 8 | 14.92 | 6.20 |
| Example 9 | 14.65 | 5.77 |
| Example 10 | 13.88 | 6.16 |
| Example 11 | 11.43 | 4.49 |
| Example 12 | 13.67 | 5.51 |
| Comparative Example 1 | 31.89 | 27.35 |
| Comparative Example 2 | 29.61 | 25.13 |
| Comparative Example 3 | 19.88 | 10.53 |
| Comparative Example 4 | 17.91 | 8.98 |
| Comparative Example 5 | 26.37 | 19.12 |
| Comparative Example 6 | 27.29 | 22.09 |

It can be seen from Table 3 that, after the lithium batteries in Examples 1 to 12 each were subjected to 100 cycles and then to a thermal stability test at a high temperature, the voltage drop change rate is only 11% to 15%, which is much lower than the voltage drop change rate of each of the lithium batteries in Comparative Examples 1 to 6 after 100 cycles and a thermal stability test.

In addition, there is also a large difference in the volume change rate. The volume expansion of the lithium batteries in Comparative Examples 1 to 6 is more significant, and the volume change rates of the lithium batteries in Examples 1 to 12 after multiple cycles are only 4% to 7% during high-temperature storage, which are much smaller than the volume change rates of lithium batteries in Comparative Examples 1 to 6. It can be seen that, when used in a LIB, the new cyclic sulfonate additive prepared by the present disclosure can greatly improve the thermal stability of the LIB after multiple cycles and inhibit the decomposition of an electrolyte to produce a gas, which has promising application prospects.

The above are merely preferred examples of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. A cyclic sulfonate additive for an electrolyte of a lithium-ion battery (LIB), comprising a structure shown in formula I:

formula I

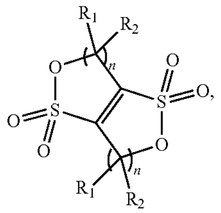

wherein $R_1$ and $R_2$ each are independently one selected from the group consisting of hydrogen, fluorine, phenyl, fluorine or cyano-containing phenyl, linear or non-linear alkyl with 1 to 6 carbon atoms, and fluorine-containing alkyl with 1 to 6 carbon atoms; and n is 1 or 2.

2. The cyclic sulfonate additive for the electrolyte of the LIB according to claim 1, comprising one or more structures shown in formulas S01 to S27:

S01

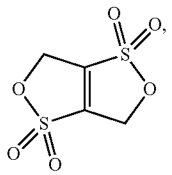

S02

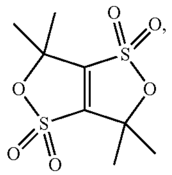

S03

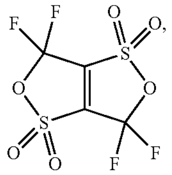

S04

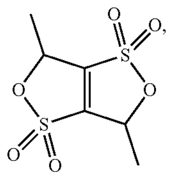

-continued
S05
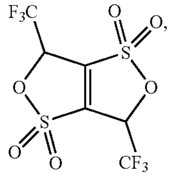,
S06
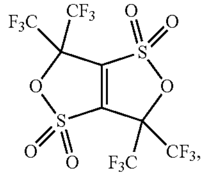,
S07
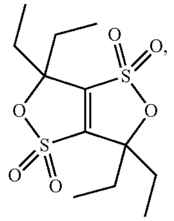,
S08
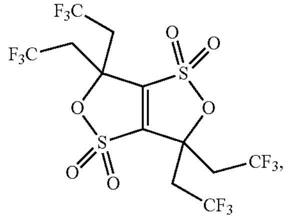,
S09
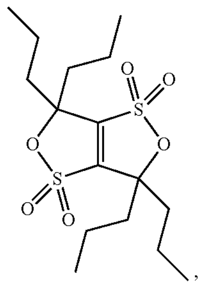,
S10
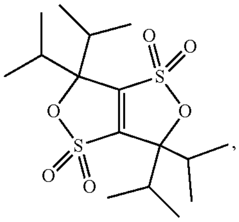,
S11
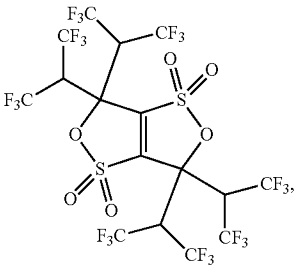,
-continued
S12
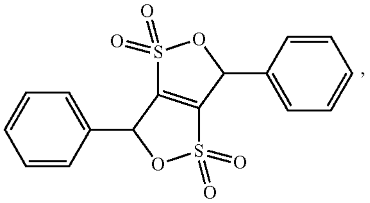,
S13
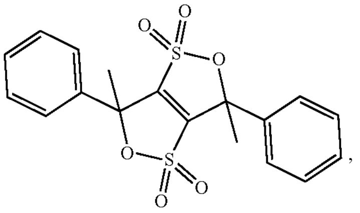,
S14
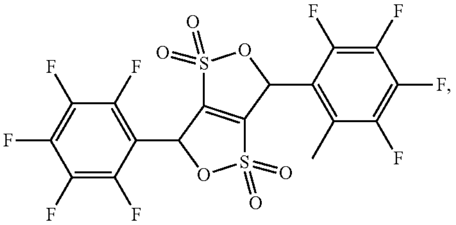,
S15
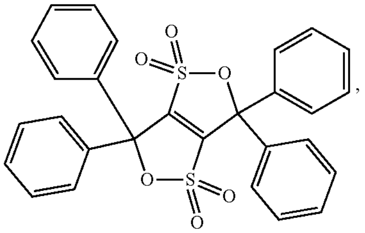,
S16
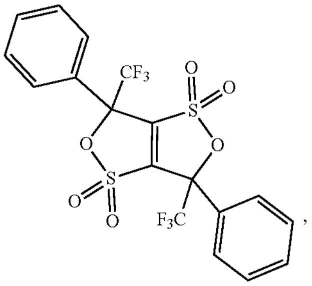,
S17
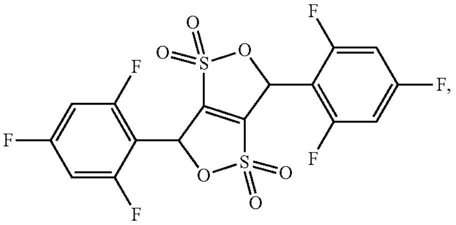, -continued

S18

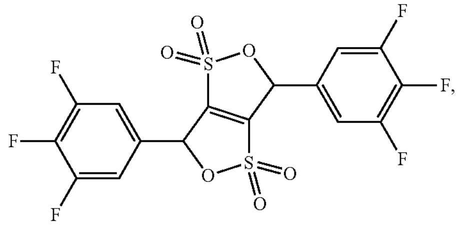

S19

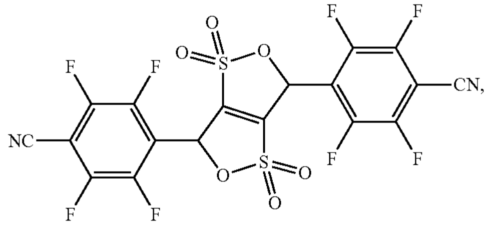

S20

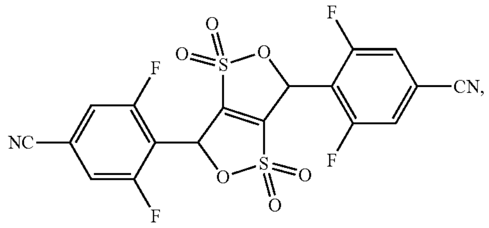

S21

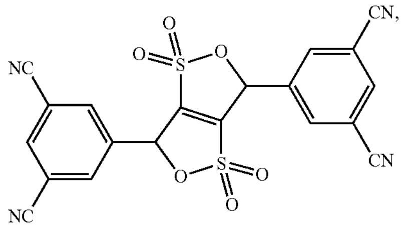

S22

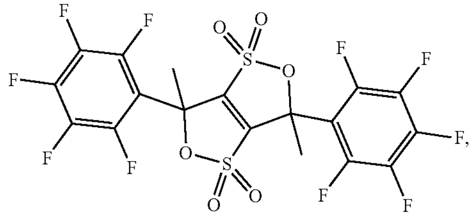

S23

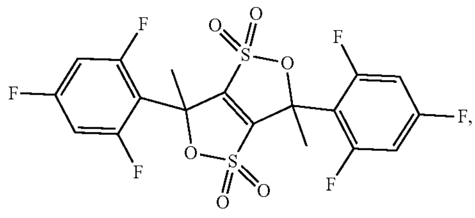

S24

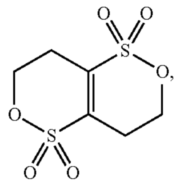

-continued

S25

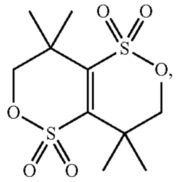

S26

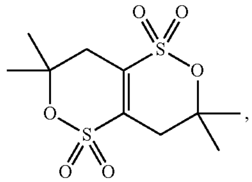

and

S27

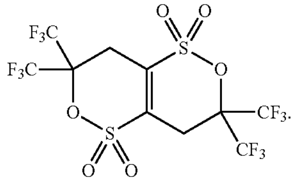

3. A preparation method of the cyclic sulfonate additive for the electrolyte of the LIB according to claim 1, comprising the following steps:

1) under a first protection of a first inert gas and at a temperature of 20° C. to 110° C., dispersing a mixture of a raw material 1, sodium sulfite, and sodium bisulfite uniformly in a solvent, conducting a first reaction for 1 h to 24 h, removing the solvent under a first reduced pressure until there is no distillate, and subjecting a residue to an acidification with a concentrated hydrochloric acid to obtain a intermediate 1, wherein structures of the raw material 1 and the intermediate 1 are as follows:

raw material 1

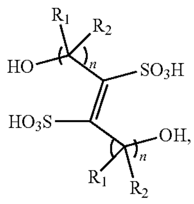

intermediate 1

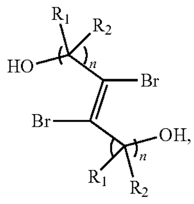

wherein n is 1 or 2; and the solvent is one or a combination of two or more selected from the group consisting of water, methanol, ethanol, acetonitrile, and tetrahydrofuran (THF); and 2) under a second protection of a second inert gas, adding an organic solvent to the intermediate 1, heating at 80° C. to 180° C. for a reflux to separate water until there is no water, and removing the organic solvent under a second reduced pressure until there is no distillate; and heating at 10 Pa to 3,000 Pa and 100° C. to 230° C. to allow a second reaction for 1 h to 20 h to obtain the cyclic sulfonate additive for the electrolyte of the LIB, wherein the organic solvent is one or a combination of two or more selected from the group consisting of chlorobenzene, dichlorobenzene, and nitrobenzene.

4. The method according to claim 3, wherein a mole number of the sodium sulfite is 0.2 to 0.8 times a mole number of the raw material 1; and a mole number of the sodium bisulfite is 1.8 to 2.4 times the mole number of the raw material 1.

5. A non-aqueous electrolyte of the LIB, comprising a non-aqueous solvent, an electrolyte lithium salt, and the cyclic sulfonate additive for the electrolyte of the LIB according to claim 1, wherein an amount of the cyclic sulfonate additive for the electrolyte of the LIB is 0.01 wt % to 10 wt % of a total amount of the non-aqueous electrolyte of the LIB.

6. The non-aqueous electrolyte of the LIB according to claim 5, wherein the non-aqueous solvent is one or a combination of two or more selected from the group consisting of ethylene carbonate, propylene carbonate, butylene carbonate, fluoroethylene carbonate (FEC), dimethyl carbonate (DMC), diethyl carbonate (DEC), dipropyl carbonate (DPC), ethyl methyl carbonate (EMC), methyl propyl carbonate (MPC), ethyl propyl carbonate, methylpropyne carbonate, 1,4-butyrolactone, methyl propionate, methyl butyrate, ethyl acetate, ethyl propionate, propyl propionate, and ethyl butyrate.

7. The non-aqueous electrolyte of the LIB according to claim 5, wherein an amount of the electrolyte lithium salt is 10 wt % to 20 wt % of the total amount of the non-aqueous electrolyte of the LIB; and the electrolyte lithium salt is one or a combination of two or more selected from the group consisting of $LiPF_6$, $LiCIO_4$, $LiBF_4$, LiBOB, LiODFB, LiTDI, LiTFSI, and LiFSI.

8. A LIB, comprising a negative electrode, a positive electrode, and a separator and an electrolyte arranged between the negative electrode and the positive electrode, wherein the electrolyte is the non-aqueous electrolyte of the LIB according to claim 5.

9. The non-aqueous electrolyte of the LIB according to claim 5, wherein the cyclic sulfonate additive for the electrolyte of the LIB comprises one or more structures shown in formulas S01 to S27:

S01

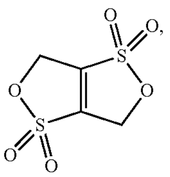

S02

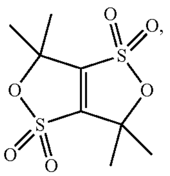

-continued

S03

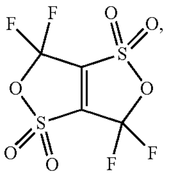

S04

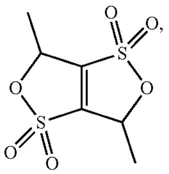

S05

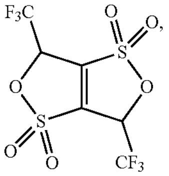

S06

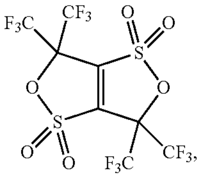

S07

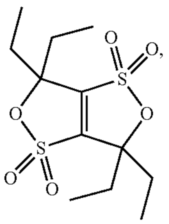

S08

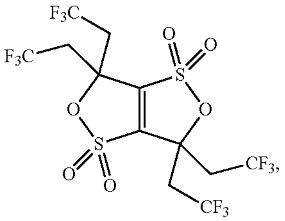

S09

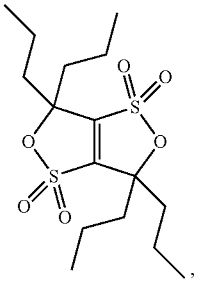

-continued
S10
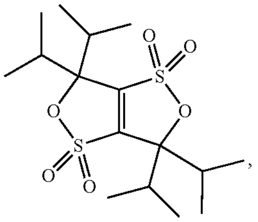
S11
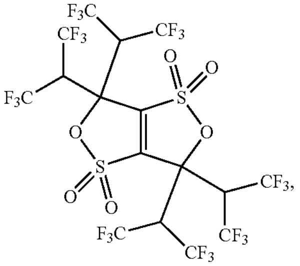
S12
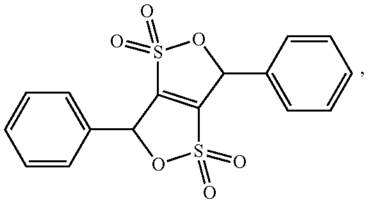
S13
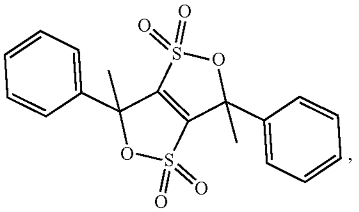
S14
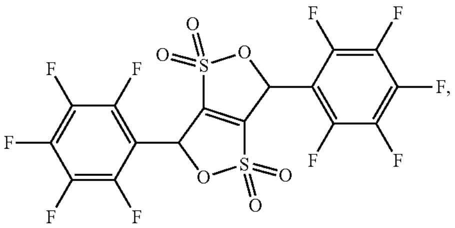
S15
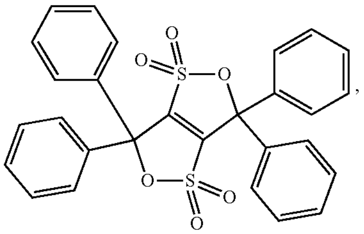
-continued
S16
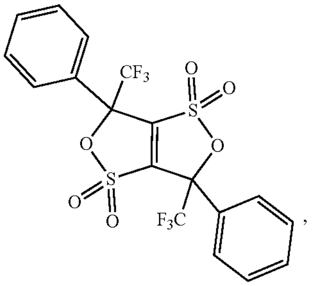
S17
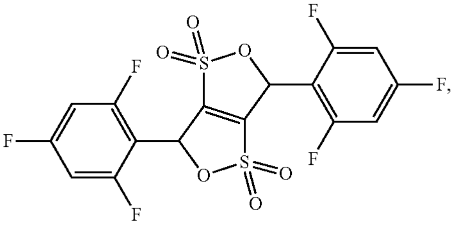
S18
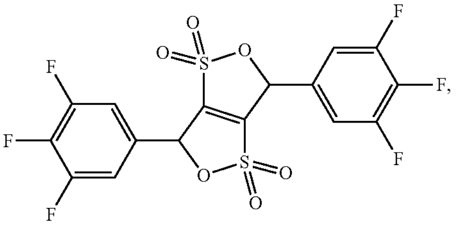
S19
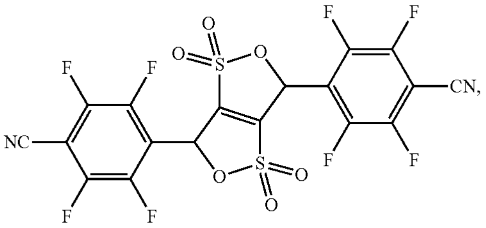
S20
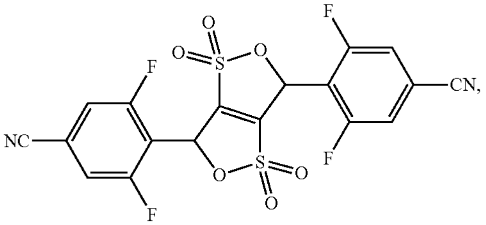
S21
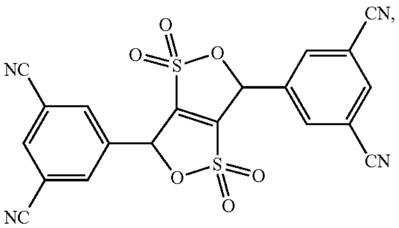

-continued

S22
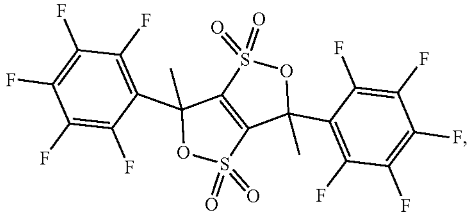

S23
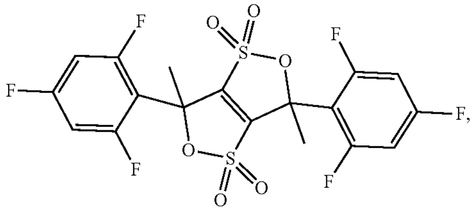

S24
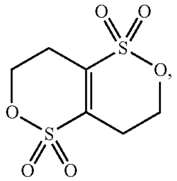

S25
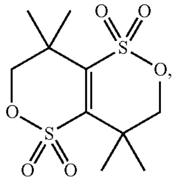

S26
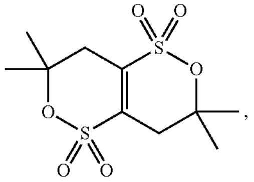

and

S27
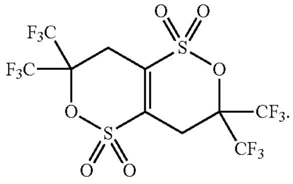

10. The non-aqueous electrolyte of the LIB according to claim 5, wherein a preparation method of the cyclic sulfonate additive for the electrolyte of the LIB comprises the following steps:

1) under a first protection of a first inert gas and at a temperature of 20° C. to 110° C., dispersing a mixture of a raw material 1, sodium sulfite, and sodium bisulfite uniformly in a solvent, conducting a first reaction for 1 h to 24 h, removing the solvent under a first reduced pressure until there is no distillate, and subjecting a residue to an acidification with a concentrated hydrochloric acid to obtain a intermediate 1, wherein structures of the raw material 1 and the intermediate 1 are as follows:

raw material 1

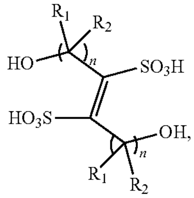

intermediate 1

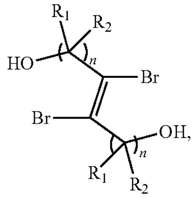

wherein n is 1 or 2; and the solvent is one or a combination of two or more selected from the group consisting of water, methanol, ethanol, acetonitrile, and tetrahydrofuran (THF); and 2) under a second protection of a second inert gas, adding an organic solvent to the intermediate 1, heating at 80° C. to 180° C. for a reflux to separate water until there is no water, and removing the organic solvent under a second reduced pressure until there is no distillate; and heating at 10 Pa to 3,000 Pa and 100° C. to 230° C. to allow a second reaction for 1 h to 20 h to obtain the cyclic sulfonate additive for the electrolyte of the LIB, wherein the organic solvent is one or a combination of two or more selected from the group consisting of chlorobenzene, dichlorobenzene, and nitrobenzene.

11. The non-aqueous electrolyte of the LIB according to claim 10, wherein a mole number of the sodium sulfite is 0.2 to 0.8 times a mole number of the raw material 1; and a mole number of the sodium bisulfite is 1.8 to 2.4 times the mole number of the raw material 1.

12. The LIB according to claim 8, wherein the non-aqueous solvent is one or a combination of two or more selected from the group consisting of ethylene carbonate, propylene carbonate, butylene carbonate, fluoroethylene carbonate (FEC), dimethyl carbonate (DMC), diethyl carbonate (DEC), dipropyl carbonate (DPC), ethyl methyl carbonate (EMC), methyl propyl carbonate (MPC), ethyl propyl carbonate, methylpropyne carbonate, 1,4-butyrolactone, methyl propionate, methyl butyrate, ethyl acetate, ethyl propionate, propyl propionate, and ethyl butyrate.

13. The LIB according to claim 8, wherein an amount of the electrolyte lithium salt is 10 wt % to 20 wt % of the total amount of the non-aqueous electrolyte of the LIB; and the electrolyte lithium salt is one or a combination of two or more selected from the group consisting of $LiPF_6$, $LiClO_4$, $LiBF_4$, LiBOB, LIODFB, LiTDI, LiTFSI, and LiFSI.

* * * * *